Mar. 27, 1923.
O. KLOSTER ET AL.
MACHINE FOR DRESSING FISH.
FILED MAY 8, 1918.
1,449,610.
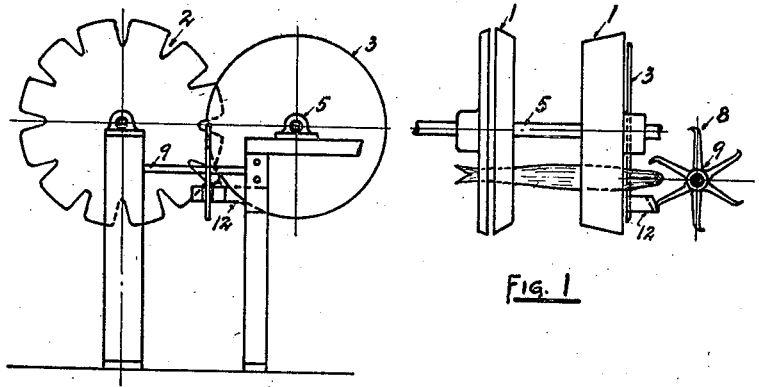
Fig. 1
Fig. 2
Fig. 3
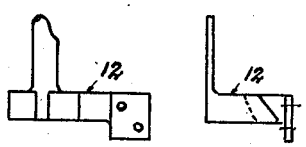
Fig. 4
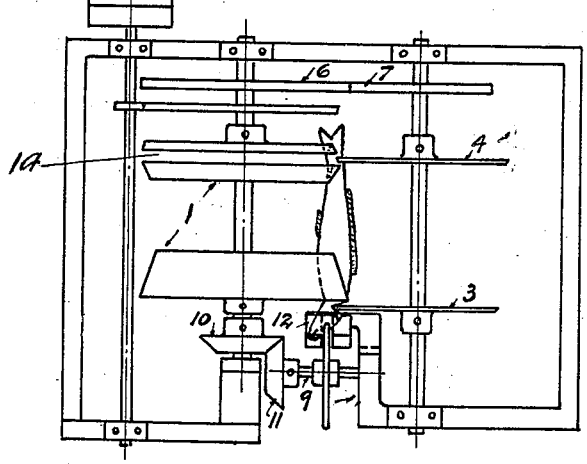
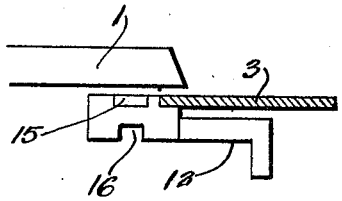
Fig. 5
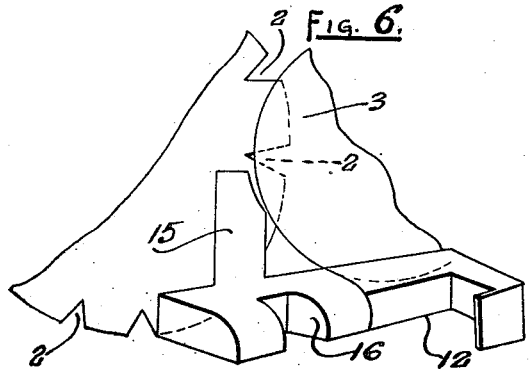
Fig. 6
Inventors
Ole Kloster
Theodor Kloster
By G. Wright Arnold
Attorney.

Patented Mar. 27, 1923.

1,449,610

UNITED STATES PATENT OFFICE.

OLE KLOSTER AND THEODOR KLOSTER, OF STAVANGER, NORWAY.

MACHINE FOR DRESSING FISH.

Application filed May 8, 1918. Serial No. 233,378.

*To all whom it may concern:*

Be it known that we, OLE KLOSTER and THEODOR KLOSTER, subjects of the King of Norway, residing at Stavanger, Norway, have invented a Machine for Dressing Fish; and we do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

Our invention relates to the art of fish dressing machines. More particularly, our invention relates to that type of fish dressing machine which operates upon the principle of removing the entrails by pulling off the head of the fish.

A primary object of our invention is to provide a machine which will receive a fish and maintain the same in such position that knives may operate to sever the tail portion and partially sever the head, and, almost simultaneously with the operation of the knives, to maintain the fish in position while another means seizes the partially severed head and completes the separation thereof from the body and drawing therewith the entrails of the fish. A further primary object of our invention is to provide a device to attain said ends, which will operate efficiently and greatly reduce the cost of cleaning fish which are subject to be cleaned in this manner.

The above mentioned general objects of our invention, together with others inherent in the same, are attained by the mechanism illustrated in the following drawings, the same being merely preferred exemplary forms of embodiment of our invention, throughout which drawings like reference numerals indicate like parts:

Figure 1 is a view of a machine embodying our invention in end elevation;

Fig. 2 is a view of the same in side elevation;

Fig. 3 is a plan view of the same;

Fig. 4 is a view of a guard, that is a detail of the same;

Fig. 5 is a plan view of said detail; and

Fig. 6 is a view in perspective of said detail.

The machine consists of two wheels 1 with transverse circumferential V-shaped openings 2 therein in which the fish is held. In one of said wheels a circumferential V-shaped opening 14 is provided and said wheel is also provided with a circumferential V-shaped opening 13. These wheels are operatively disposed in opposition to knives 3 and 4, preferably rotary, which are disposed upon a shaft 5. On shaft 5 is also located gear 7 which meshes with gear 6, from which last named gear, power is transmitted. Upon a shaft 9, a wheel having hooks 8 is mounted which wheel receives its power through bevel gears 10 and 11. A guard 12 is operatively disposed in respect to hooks 8, to assist in holding the fish while said hook operates to complete the severing of the head and drawing the entrails therewith.

The operation of our invention is as follows: Fish are placed on their backs in the wheels 1 with the tail portion in the circumferential V-shaped opening 13 and the anterior portion of the fish in the circumferential V-shaped opening 2. The bottom of said openings 2 and 13 slope towards each other, thus preventing longitudinal displacement of the fish. Then, upon the wheels being rotated, the fish is carried against the knives 3 and 4. The direction of rotation of the wheels 1 is opposite to that of the knives 3 and 4. The relation between the rate of rotation of the respective wheels and knives may be adjusted by means of the gears 6 and 7. As soon as the fish has passed the knife 3, the hook 8 engages the head and completes the severing thereof, pulling out at the same time, the entrails so that the fish is clean and ready for use. To assist in maintaining the fish in position during the said operation the guard 12 is provided.

Obviously, changes may be made in the form, dimensions, and arrangement of the parts of our invention, without departing from the principle thereof, the above setting forth only a preferred form of embodiment.

We claim:

1. A fish dressing machine embodying a wheel adapted to hold a fish by means of transverse circumferential V-shaped openings, a knife operatively disposed with respect to said wheel whereby the head portion is partially severed from the body, and a hook operatively disposed to pull off said partially severed head portion and draw with it the entrails.

2. A fish dressing machine comprising a fish wheel adapted to hold the tail portions of a fish by means of a transverse circumferentially V-shaped opening, said wheel being provided with a deep circumferential groove, a knife with its cutting edge extending within said groove adapted to cut off the fin portion of the tail portion of a fish, a second wheel adapted to hold the head portion of a fish by means of a transverse circumferential V-shaped opening, said V-shaped openings registering with the similar openings of the first wheel, a knife operatively disposed with respect to said second wheel whereby the head portion is partially severed from the body, and a hook operatively disposed to pull off said partially severed head portion and draw with it the entrails.

3. A fish dressing machine comprising a first wheel adapted to hold the tail portions of a fish by means of a plurality of transverse circumferential V-shaped openings, the bottom of which openings slope inwardly to hold the fish against lengthwise displacement, said wheel being also provided with a deep circumferential groove, a rotary knife with its cutting edge extending within said groove adapted to cut off the fin portion of the tail portion of a fish, a second wheel adapted to hold the head portions of a fish by means of a plurality of transverse circumferential V-shaped openings, the bottom of which openings slope inwardly to hold the fish against lengthwise displacement, said V-shaped openings registering with the similar openings of the first wheel, a rotary knife operatively disposed with respect to said second wheel whereby the head portion is partially severed from the body, a wheel provided with hooks operatively disposed to pull off said partially severed head portion and draw with it the entrails, and a guard to assist in holding the fish when the hook removes the said head portion and entrails.

4. A fish dressing machine embodying a knife, means to hold and present fish to said knife for the purpose of partially severing the head of said fish, and a hook operatively disposed to pull off the said partially severed head and draw with it the entrails.

In testimony that we claim the foregoing as our invention, we have signed our names in presence of two subscribing witnesses.

OLE KLOSTER.
THEODOR KLOSTER.

Witnesses:
O. RISVOLD,
H. COSNELINSSEN.